(12) United States Patent
Na et al.

(10) Patent No.: US 12,442,061 B1
(45) Date of Patent: Oct. 14, 2025

(54) HIGH-ENTROPY ALLOYS (HEAs), METHODS FOR MAKING HEAs, AND USES THEREOF

(71) Applicant: The Government of the United States of America, as represented by the Secretary of the Navy, Arlington, VA (US)

(72) Inventors: Suok-Min Na, Laurel, MD (US); Paul K. Lambert, Columbia, MD (US); Nicholas J. Jones, Fairfax, VA (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 283 days.

(21) Appl. No.: 17/149,473

(22) Filed: Jan. 14, 2021

Related U.S. Application Data

(60) Provisional application No. 62/960,935, filed on Jan. 14, 2020.

(51) Int. Cl.
*C22C 30/00* (2006.01)
*F25B 21/00* (2006.01)

(52) U.S. Cl.
CPC .............. *C22C 30/00* (2013.01); *F25B 21/00* (2013.01); *C22C 2202/02* (2013.01); *F25B 2321/002* (2013.01)

(58) Field of Classification Search
None
See application file for complete search history.

(56) References Cited

U.S. PATENT DOCUMENTS

| | | | |
|---|---|---|---|
| 7,626,300 B2 | 12/2009 | Sato | |
| 7,988,795 B2 | 8/2011 | Hirota | |
| 2015/0292782 A1* | 10/2015 | Lonzarich | C30B 7/00 |
| | | | 62/3.1 |
| 2017/0209922 A1* | 7/2017 | Kato | B22D 23/00 |
| 2022/0411902 A1 | 12/2022 | Niarchos | |

FOREIGN PATENT DOCUMENTS

| | | | |
|---|---|---|---|
| CN | 103173674 B | | 6/2013 |
| CN | 104141127 B | * | 2/2017 |
| CN | 109576607 A | | 4/2019 |
| CN | 111235458 B | | 6/2020 |

OTHER PUBLICATIONS

Machine translation of CN104141127B. (Year: 2017).*

(Continued)

*Primary Examiner* — Xiaowei Su
(74) *Attorney, Agent, or Firm* — Dawn Russell; Jesus Hernandez; U.S. Department of the Navy, Office of the General Counsel

(57) ABSTRACT

High entropy alloys (HEAs) are provided, which exhibit a high magnetic entropy change over a large temperature range, as well as methods for making HEAs. The invention also provides HEAs that exhibit notable magnetostriction at room temperature, and alloying methods for producing them. The materials and methods of the invention may be used, for example, in solid-state refrigeration apparatus and methods, as well as in transduction devices and energy harvesting applications.

9 Claims, 16 Drawing Sheets

(56) References Cited

OTHER PUBLICATIONS

Na, AIP Advances 9, 035010. (Year: 2019).*
Na'2018 (AIP Advances, 8, 056412 (2018)). (Year: 2018).*
Praveen (Materials Science and Engineering A 534 (2012)83-89). (Year: 2012).*
He, Acta Materialia. 62(2014)105-113. (Year: 2014).*
Suok-Min Na, Paul K. Lambert, Hyunsoo Kim, Johnpierre Paglione, Nicholas J. Jones, Thermomagnetic properties and magnetocaloric effect of FeCoNiCrAl-type high-entropy alloys, AIP Advances (Mar. 11, 2019).

* cited by examiner

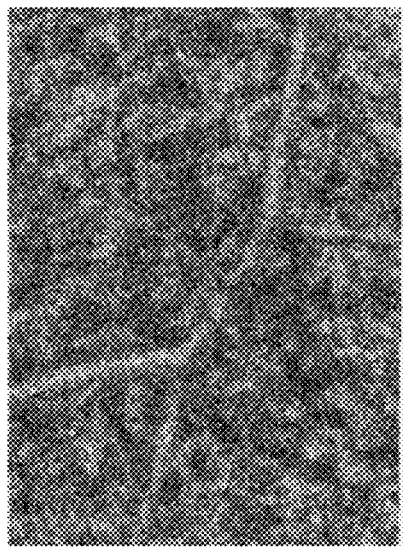
FIG. 6C
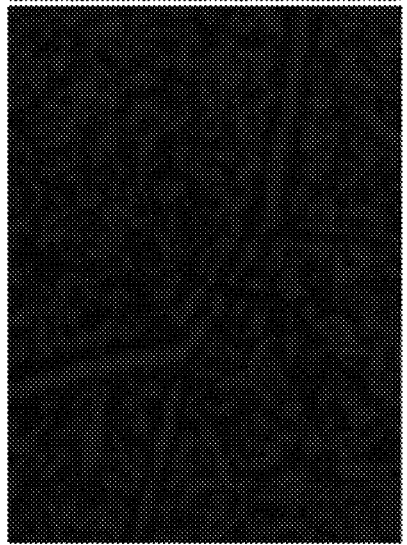
FIG. 6B
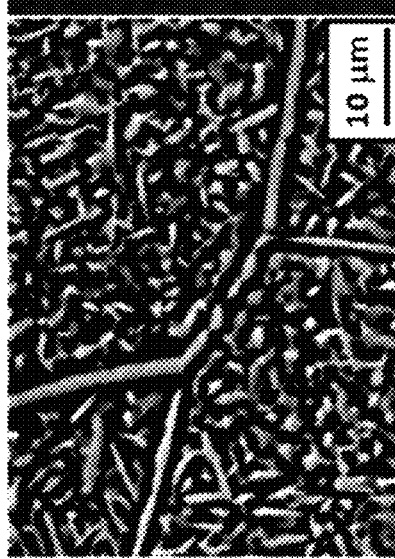
FIG. 6A
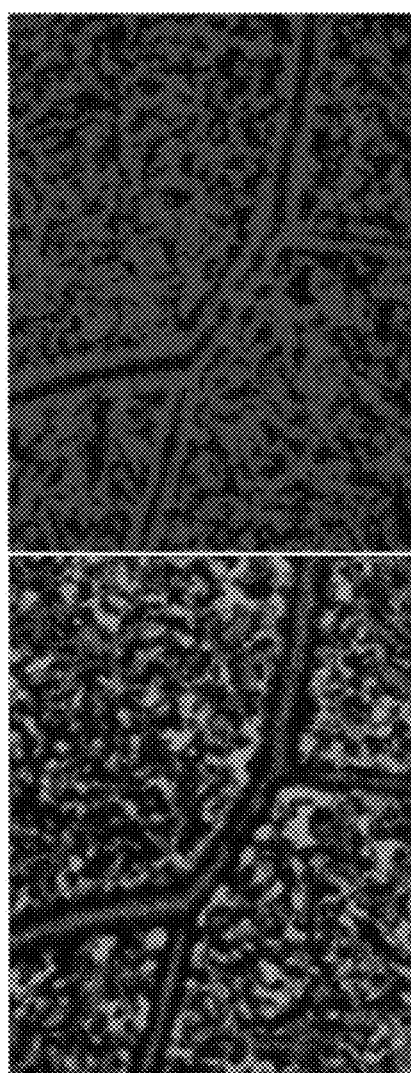
FIG. 6F
FIG. 6E
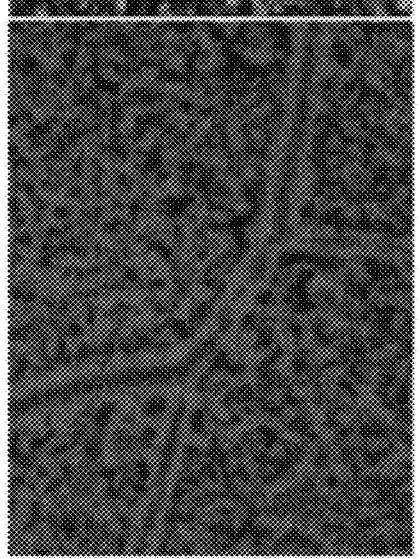
FIG. 6D

HIGH-ENTROPY ALLOYS (HEAs), METHODS FOR MAKING HEAs, AND USES THEREOF

RELATED APPLICATION DATA

This application claims priority under 35 U.S.C. § 119(e) to U.S. Provisional Application No. 62/960,935, filed on Jan. 14, 2020. The entire contents of this application are incorporated herein by reference.

FIELD OF THE INVENTION

The invention provides high entropy alloys (HEAs) that exhibit a high magnetic entropy change over a large temperature range, as well as methods for making HEAs. The invention also provides HEAs that exhibit significant magnetostriction at room temperature, and alloying methods for producing them. The materials and methods of the invention may be used, for example, in solid-state refrigeration apparatus and methods, as well as in transduction devices and energy harvesting applications.

BACKGROUND OF THE INVENTION

Magnetostrictive materials can act as both actuators and sensors, and have the potential to exhibit structural mechanical properties while maintaining their multi-functional properties and "smart material" behavior. The major challenge is to maintain a high magnetostriction (strain due to an applied magnetic field), with low magnetic anisotropy, high mechanical strength, and large ductility.

Traditional giant magnetostrictive materials are based on rare earth elements, only operate at cryogenic temperatures, and are expensive, brittle, and often pyrophoric. By adding iron (Fe) to the composition, the magnetic strain is reduced substantially, but the performance is still adequate and now operates at room temperature; the materials are expensive, brittle, and often pyrophoric, though, due to the large percentage of rare earth elements. Fe-based alloys exhibit a further knock down in magnetostriction, but with improved mechanical strength and elastic modulus, and are capable of operating under tension. While still not ductile, these rare-earth-free alloys are much more structural than their rare-earth-based counterparts.

In a quest to find new alloys that exhibit high magnetostriction, most (if not all) of the soluble binary alloys have been tried, and many of the ternary alloys have also been attempted. $Fe_{1-x}Ga_x$ alloys generally exhibit the largest useful magnetostriction, with other alloying additions being generally deleterious to the magnetic performance, or not helpful. Some alloying additions, such as NbC or C, can improve the mechanical properties, however, with no measurable effect on the magnetic properties.

Magnetocaloric materials have the potential to improve the efficiency of traditional gas compression refrigeration, providing a solid-state cooling methodology with no need for environment-harming refrigerants. The challenge, however, is to maintain a high magnetic entropy change over a large temperature range. Giant magnetocaloric materials exhibit very large magnetic entropy changes ($-\Delta S_m$), but over a very narrow temperature band, due to a first-order magneto-structural phase transformation. In addition, the transition temperature of this type of material is often well below room temperature, reducing their applicability to everyday applications. Second order magnetic transitions exhibit a smaller peak value, but over a much wider temperature range. This allows them to operate over a larger temperature range, and their overall performance can be captured by the refrigerant capacity (RC).

In a quest to find new alloys with a high peak entropy change and a broad temperature transition, many unique classes of materials have been pursued in recent times. High entropy metallic glasses (HEMG) with rare earth (RE) elements exhibit strong topological and chemical disorder, resulting in an enhanced large magnetocaloric effect (MCE) and refrigerant capacity, which are important for improving the efficiency of the refrigerant. (J. Huo, et al., *J. Alloys Compd.* 776, 202 (2019); J. Huo, et al., *J. Appl. Phys.* 117, 073902 (2015); J. T. Huo, et al., Intermetallics 58, 31 (2015); Q. Luo and W. H. Wang, *J. Alloys Compd.* 495, 209 (2010); and C. Mayer, et al., *J. Alloys Compd.* 507, 370 (2010).) However, their Curie temperatures ($T_c$) are far below room temperature (RT), which is unsuitable for ambient temperature applications. On the other hand, RE-free soft magnetic alloys have $T_c$ close to RT, but their MCE is comparatively small. (P. Yu, et al., Intermetallics 95, 85 (2018); X. C. Zhong, et al., *J. Alloys Compd.* 633, 188 (2015); J. Li, et al., *J. Non-Crystalline Solids* 425, 114 (2015); and Y. K. Fang, et al., *J. Appl. Phys.* 105, 07A910 (2009))

High-entropy alloys (HEAs) are another class of alloys that has gained much popularity in structural, high temperature, and corrosion resistant applications, but can also exhibit beneficial magnetic properties. (M. S. Lucas, et al., *J. Appl. Phys.* 113, 17A923 (2013); M. Kurniawan, et al., *IEEE Magnetics Letters* 7, 6105005 (2016).) High-entropy alloys generally contain five or more principal elements, which are often found in equiatomic and nearly-equiatomic compositions; in contrast, conventional alloys are generally based on one major element and several minor elements, such as iron in steels. (J. W. Yeh, et al., *Adv. Eng. Materials* 6, 299 (2004).) Substituting or adding elements may change the phases present in the annealed sample, as well, which can be predicted for the annealed condition by calculating the valence electron concentration (VEC) of the alloy; the resultant phases will also determine the alloy's magnetic properties. (D. B. Miracle and O. N. Senkov, *Acta Materialia* 122, 448 (2017))

In previous work, the low Curie Temperature ($T_c$) of FeCoNiCr ($T_c \approx 104$ K) was shifted to room temperature by adding aluminum as a fifth, equiatomic component (FeCoNiCrAl: $T_c \approx 300$ K). In addition, the sharpness of the FeCoNiCr magnetic transition changed drastically by adding Al (S. M. Na, et al., *AIP Advances* 8, 056412 (2017)), exhibiting a gradual and continuous change in magnetization near $T_c$, which may be promising for use in magnetic refrigeration (C. Mayer, et al., *J. Appl. Phys* 110, 053920 (2011)).

Rigid band theory can help inform some alloying decisions. The theory states that for small alloying additions, the density of states of the alloy (the band structure) remains unchanged (rigid), and the only thing that changes is the fermi level, due to a small change in the electron concentration. (N. J. Jones et al., *Journal of Applied Physics* 117, 17A913 (2015).) While rigid band theory is normally applied to conventional alloys, it can nevertheless inform other systems and provide an initial platform for new alloy decisions.

However, none of the HEAs developed to date provide high magnetic entropy change over a sufficiently large temperature range to permit significant expansion in solid-state refrigeration capability. Further, none of the HEAs developed to date provide the high magnetostriction, low magnetic anisotropy, high mechanical strength, and high ductility needed to permit their use in transduction devices and energy harvesters.

SUMMARY OF THE INVENTION

The invention described herein including the various aspects and/or embodiments thereof, meets the unmet needs of the art, as well as others, by providing HEAs that exhibit a high magnetic entropy change over a large temperature range, as well as methods for making HEAs. The materials and methods of the invention may be used, for example, in solid-state refrigeration apparatus and methods.

According to a first aspect of the invention, high entropy alloys are provided that include Fe from 15-20 at %, Co from 15-20 at %, Ni from 15-30 at %, Cr from 10-20 at %, optionally Mn from 15-20 at %, and from 15-30 at % of an alloying addition selected from the group consisting of Cu, Al, and Ga.

Another aspect of the invention provides methods for forming high entropy alloys, including: providing pseudo iron elements comprising Fe, Co, Ni, Cr, and optionally Mn; providing an alloying addition element selected from the group consisting of Cu, Al, and Ga; combining the pseudo iron elements and alloying addition element; and melting and mixing the pseudo iron elements and alloying addition element to form the HEA.

A further aspect of the invention provides a solid-state refrigeration apparatus, including a high entropy alloy (HEA) including Fe from 15-20 at %, Co from 15-20 at %, Ni from 15-30 at %, Cr from 10-20 at %, optionally Mn from 15-20 at %, and from 15-30 at % of an alloying addition selected from the group consisting of Cu, Al, and Ga; and a source of magnetic field.

Other features and advantages of the present invention will become apparent to those skilled in the art upon examination of the following or upon learning by practice of the invention.

BRIEF DESCRIPTION OF THE DRAWINGS

FIG. 5A shows the XRD patterns of as-cast alloys. FIG. 5B shows the XRD patterns after annealing at 800° C.

FIG. 6A is an SEM image providing a microstructural analysis of FeCoNiCrAl after annealing at 1000° C. FIGS. 6B-6F are EDS compositional maps of Fe, Co, Ni, Cr, and Al elements for the HEA shown in FIG. 6A.

FIG. 9A depicts magnetic hysteresis loops for FeCoNiCrAl as-cast and after annealing at 800° C. for 3 hours. FIG. 9B depicts magnetic hysteresis loops for FeCoNiCr$_{0.5}$Al$_{1.5}$ as-cast and after annealing at 800° C. for 3 hours. FIG. 9C depicts magnetic hysteresis loops for FeCoNi$_{1.5}$Cr$_{0.5}$Al as-cast and after annealing at 800° C. for 3 hours.

DETAILED DESCRIPTION OF THE INVENTION

Figure 1:
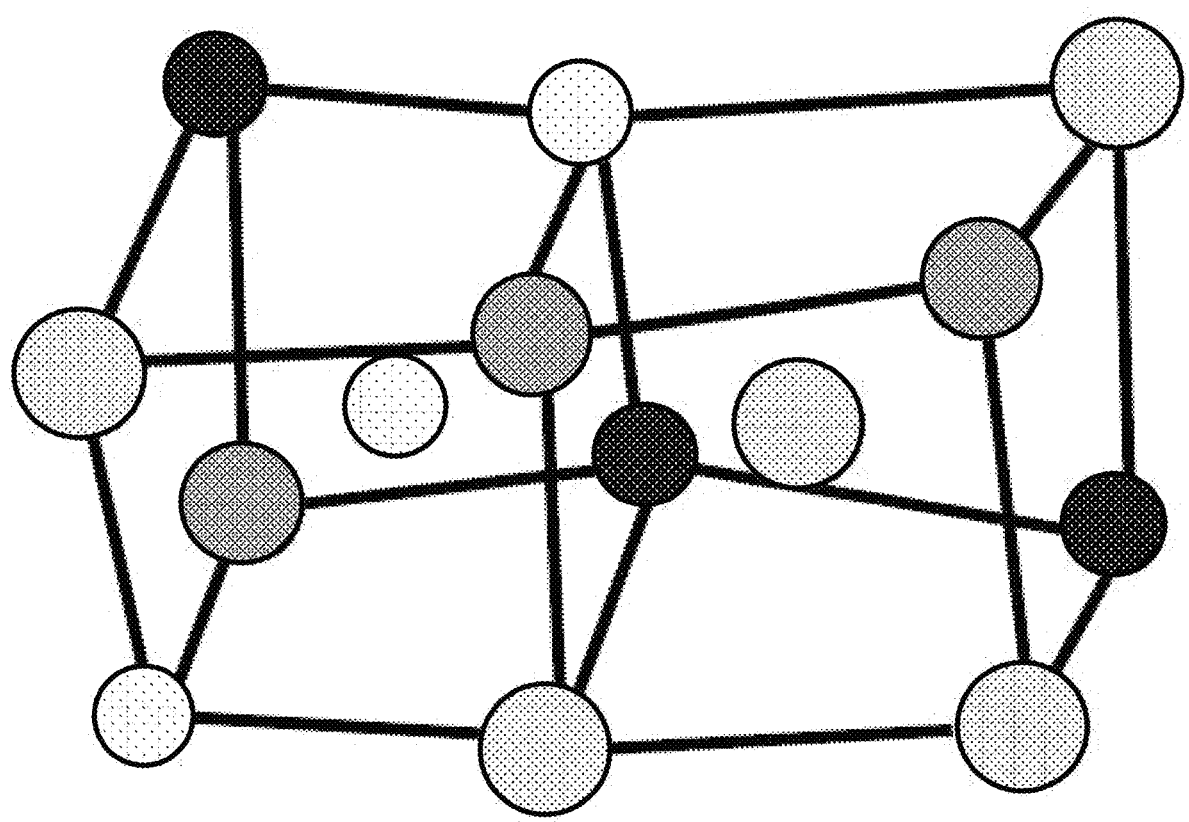
FIG. 1 is a ball-and-stick model of a high entropy alloy showing severe lattice distortion.

The invention provides HEAs that exhibit a high magnetic entropy change over a sufficiently large temperature range (for example, about 50 K or more), as well as methods for making HEAs. The materials and methods of the invention may be used, for example, in a solid-state refrigeration apparatus and methods.

The compositions, methods, and apparatus of the invention provide enhanced magnetic entropy changes as compared with conventional alloys. When used in solid-state refrigeration apparatus and methods, the HEAs beneficially permit increased efficiency as compared to gas compression-based refrigeration equipment, and eliminate the need for refrigerants (such as fluorocarbons, ammonia, sulfur dioxide, and hydrocarbons), which can have potentially harmful effects on the environment.

The HEAs of the invention are alloys that contain five or more elements, where each element is provided at a concentration of from about 10 to about 35 at %, preferably from about 10 to about 30 at %, more preferably from about 15 to about 20 at %. In some aspects of the invention, the HEAs contain five elements present in near-equiatomic ratios, i.e., about 20 at % of each element. The elements are preferably selected from the group consisting of Fe, Co, Ni, Mn, Cr, Cu, Al, and Ga.

In additional aspects of the invention, the HEAs are alloys that contain six or more elements, where each element is provided at a concentration of from about 10 to about 25 at %, preferably from about 12 to about 22 at %, more preferably from about 14 to about 20 at %, and still more preferably from about 15 to about 18 at %. In some aspects of the invention, the HEAs contain six elements present in near-equiatomic ratios, i.e., about 16.67 at % of each element. The elements are preferably selected from the group consisting of Fe, Co, Ni, Mn, Cr, Cu, Al, and Ga.

The HEAs of the invention preferably include, at a minimum, Fe, Co, Ni, and Cr. In additional aspects of the invention, the HEAs include, at a minimum, Fe, Co, Ni, Mn, and Cr. In some aspects, a "pseudo iron" including Fe, Co, Ni, Cr, and optionally Mn, may be used as a starting alloy. In further aspects of the invention, each element is preferably provided in ratios so that the electron charges sum to 0 or about zero (e.g., $^{24}$Cr (−2 e$^−$), $^{25}$Mn (−1 e$^−$), $^{26}$Fe (0 e$^−$), $^{27}$Co (+1 e$^−$), $^{28}$Ni (+2 e$^−$)).

The pseudo iron of the invention preferably includes from about 15 at % to about 30 at % Fe, from about 15 at % to about 30 at % Co, from about 15 at % to about 30 at % Ni, from about 15 at % to about 30 at % Cr, and optionally from 15 at % to about 30 at % Mn. In some aspects of the invention, the pseudo iron is formed by casting approximately equal amounts (by atomic %) of each element. For example, one pseudo iron may include about 25 at % Fe, about 25 at % Co, about 25 at % Ni, and about 25 at % Cr. Another pseudo iron may include about 20 at % Fe, about 20 at % Co, about 20 at % Ni, about 20 at % Cr, and about 20 at % Mn.

In other aspects of the invention, the pseudo iron may increase amount of Ni present relative to the other elements present in the pseudo iron (for example, from about 20 at % to about 33.33 at %), and/or may decrease the amount of Cr present relative to the other elements present in the pseudo iron (for example, from about 20 at % to about 10 at %). For example, the alloys of the invention may have the formula $FeCoNi_{1+x}Cr_{1-x}Al$, where x is from 0.0 to 0.5, and the atomic ratios of the elements may be adjusted such that the HEA includes 20 at % Fe, 20 at % Co, 30 at % Ni, 10 at % Cr, and 20 at % Al (i.e., when x is 0.5). When the alloy has the formula $FeCoNiCr_{1-x}Al_{1+x}$, where x is from 0.0 to 0.5, the atomic ratios of the elements may be adjusted such that the HEA includes 20 at % Fe, 20 at % Co, 20 at % Ni, 10 at % Cr, and 30 at % Al (i.e., when x is 0.5).

In addition to the elements forming the pseudo iron, one or more alloying additions selected from the group consisting of Cu, Al, and Ga are alloyed with the pseudo iron to form the HEAs of the invention. The alloying addition is preferably provided in an amount ranging from about 15 at % to about 25 at %, more preferably from about 16 at % to about 22 at %, and still more preferably from about 16.67 at % to about 20 at %.

Presently-preferred HEAs generated using the methods of the invention include $FeCoNi_{1+x}Cr_{1-x}Al$ where X is from 0.0-0.5 (for example, X=0.0, X=0.1, X=0.2, X=0.3, X=0.4, X=0.5), $FeCoNiCr_{1-x}Al_{1+x}$ where X is from 0.0-0.5 (for example, X=0.0, X=0.1, X=0.2, X=0.3, X=0.4, X=0.5). By altering the composition of rare earth element-free HEAs, such as FeCoNiCrAl, it is possible to define the phases present and tailor the magnetic properties, including magnetocaloric effect, exhibited by the alloys.

Additional HEA compositions formed from combinations of the elements Fe, Co, Ni, Cr, Mn, Al, Ga, and Cu are envisioned in accordance with the invention, particularly those HEAs that exhibit high magnetostriction (i.e., at least about 30 ppm).

Figure 2B:
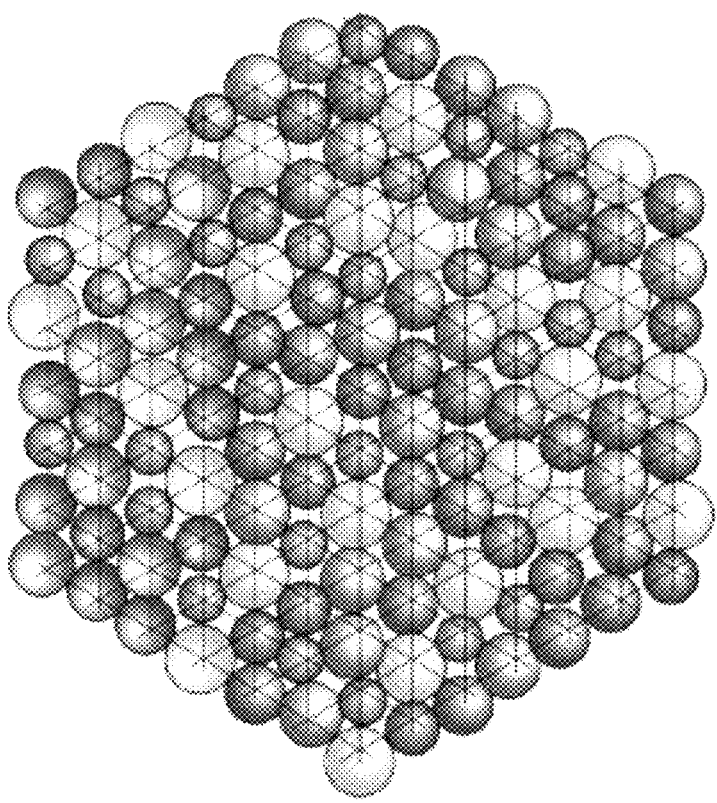
FIG. 2B shows a HEA having multiple major alloying elements with high configurational entropy.
Figure 2A:
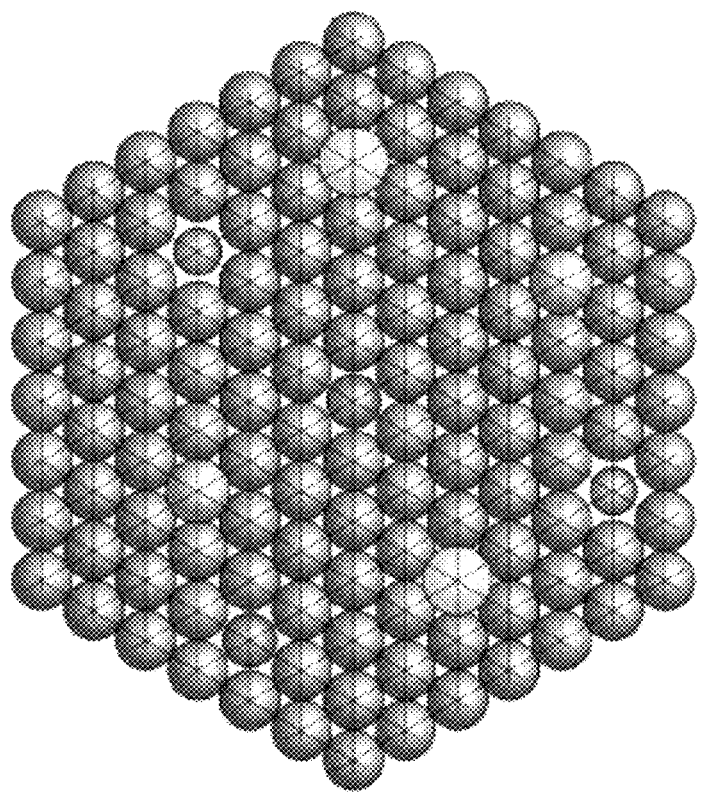
FIG. 2A shows an alloy in which one major alloying element includes other minor alloying elements.
Figure 3:
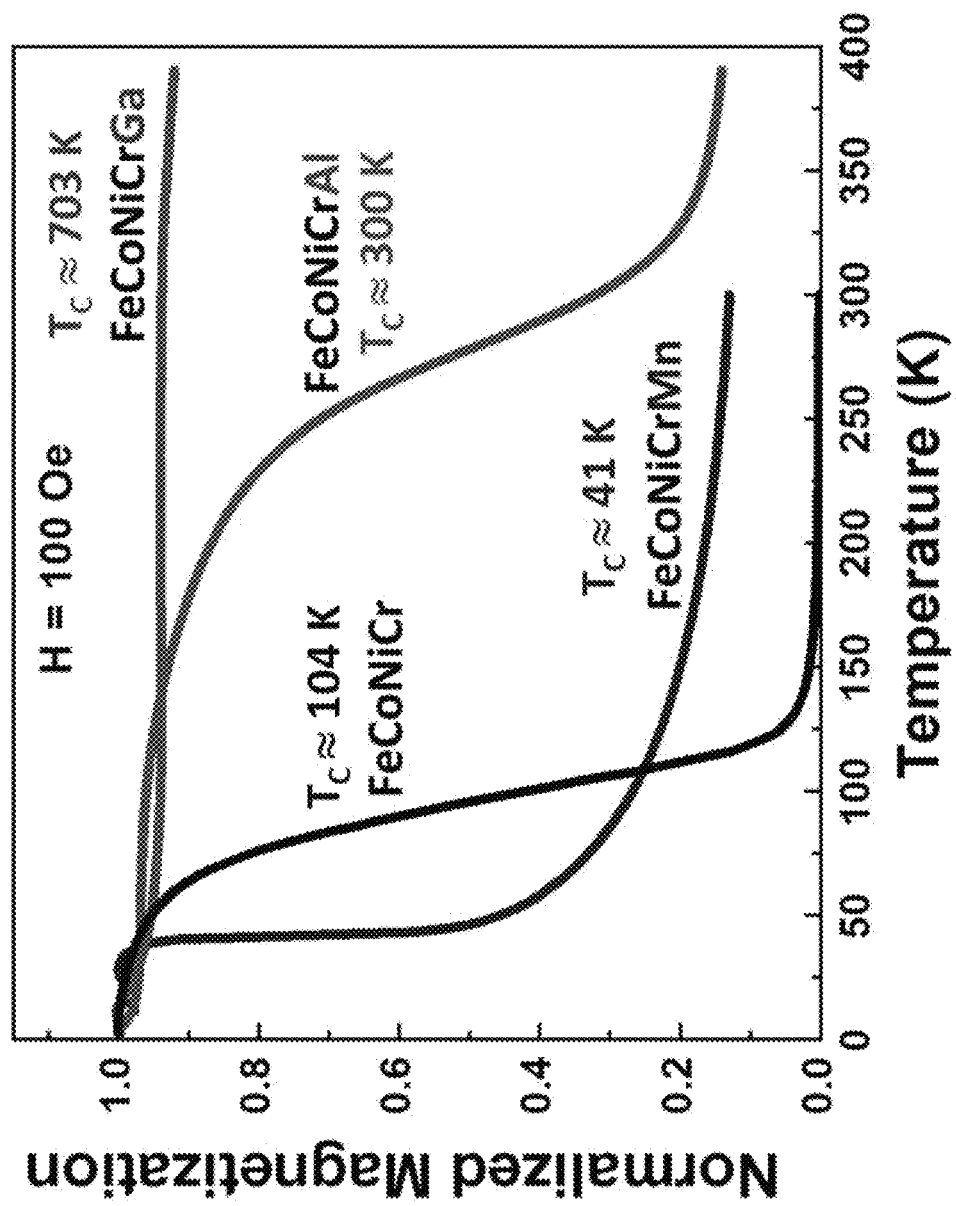
FIG. 3 is a graph depicting normalized magnetization of three HEAs (FeCoNiCrGa, FeCoNiCrAl, and FeCoNiCrMn) as a function of temperature. Magnetization of FeCoNiCr as a function of temperature is shown for comparison.

The HEAs of the invention exhibit sluggish diffusion, severe lattice distortion, and cocktail effects, as depicted using the ball-and-stick model of FIG. 1. As shown in FIG. 2B, the HEAs of the invention exhibit high configurational entropy as compared to traditional alloys in which one major element is combined with minor alloying elements (see FIG. 2A). Normalized magnetization of three HEAs (FeCoNiCrGa, FeCoNiCrAl, and FeCoNiCrMn) as a function of temperature is shown in FIG. 3, with magnetization of FeCoNiCr as a function of temperature shown for comparison.

The invention also provides methods for forming HEAs. The methods beneficially form stable, solid solutions of the elements. The HEAs of the invention are distinct from intermetallic materials, which have defined stoichiometries and ordered crystal structures.

The methods include assembling high-purity sources of each element included in the HEA. In some aspects of the invention, the elements are provided with at least 99.98% purity. In other aspects, the HEA consists essentially of the elements used to form the alloy, along with minor amounts of impurities (i.e., less than 0.2 at % incidental impurities) that do not negatively impact the magnetic properties of the HEAs, which may include magnetostriction, magnetocaloric effect, and/or magnetic hysteresis, depending on the application for which the HEA is intended. Preferably, the HEAs include less than 0.1 at % impurities, more preferably less than 0.05 at % impurities.

In some aspects of the invention, Al is added to a pseudo iron to form an HEA having the composition FeCoNiCrAl. In other aspects of the invention, Mn and Al are added to a pseudo iron to form an HEA having the composition FeCoNiCrMnAl. In another aspect of the invention, Ga is added to a pseudo iron instead of Al to form an HEA having the composition FeCoNiCrGa. In yet another aspect of the invention, Mn and Ga are added to a pseudo iron to form an HEA having the composition FeCoNiCrMnGa.

For example, HEAs are formed by adding about 20 at % Ga to an equiatomic composition of Fe, Co, Ni, and Cr. Other HEAs of the invention are formed from about 20 at % Al, and the balance is an equiatomic composition of Fe, Co, Ni, and Cr. Further HEAs of the invention are formed from about 20 at % Cu, and the balance is an equiatomic composition of Fe, Co, Ni, and Cr. Other HEAs of the invention are formed by adding about 16.67 at % Ga to an equiatomic composition of Fe, Co, Ni, Cr, and Mn. Still other HEAs of the invention are formed from about 16.67 at % Al, and the balance is an equiatomic composition of Fe, Co, Ni, Cr, and Mn. Further HEAs of the invention are formed from about 16.67 at % Cu, and the balance is an equiatomic composition of Fe, Co, Ni, Cr, and Mn.

The HEAs of the invention may be formed by directly combining five or more of the elements selected from Fe, Co, Ni, Cr, Mn, Cu, Al, and Ga, without requiring separate formation of a pseudo iron. For example, Fe, Co, Ni, Cr, and Al may be cast together to form the HEAs of the invention. Regardless of the elements included in the HEAs, and whether they are cast directly or by first forming a pseudo iron and then adding an alloying addition, the resulting HEAs may optionally be annealed.

The elements are combined, for example, in a vacuumed arc-melting apparatus that is backfilled using argon gas, and melted at low power for initial mixing. The power level is increased to medium during the alloying operation. Once fully molten, the alloy is stirred to mix the elements, and the power level is increased to high for remelting. The stirring and remelting steps are preferably carried out from 3 to 8 times to achieve uniform mixing. The material may then be annealed at temperatures that range from about 600° C. to about 1,000° C. for about 2 to about 4 hours, preferably about 3 hours.

The HEAs of the invention may be created in a manner that also permits phase control, i.e., formation of Face Centered Cubic (FCC) or Body Centered Cubic (BCC) type HEAs. FCC or BCC type HEAs may be preferred, depending on the particular use of the HEA.

The HEAs of the invention exhibit notable magnetostriction (for example, approximately 30 ppm). The HEAs of the invention also exhibit low magnetic hysteresis, and potentially useful mechanical properties. This renders them particularly useful in energy harvesting applications, and as actively-controlled structural mounts. For example, some of the HEAs of the invention exhibit a small Delta-E effect at room temperature, and elastic parameters that are similar to Fe.

Some HEAs of the invention are characterized by a modest magnetic entropy change (approximately −0.3 J/kg/K at 20 kOe) over a sufficiently large temperature range (~50+K). This renders them particularly useful in magnetocaloric applications requiring operation in varying temperature environments. The HEAs may be used to provide solid-state cooling, improving the efficiency of traditional gas compression refrigeration, and beneficially reduce or eliminate the use of environmentally-hazardous refrigerants.

Figure 4B:
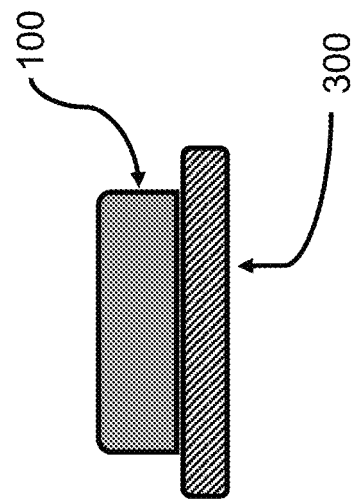
FIG. 4B is a diagram of a solid state refrigeration apparatus in which an HEA is in contact with an article to be cooled.
Figure 4A:
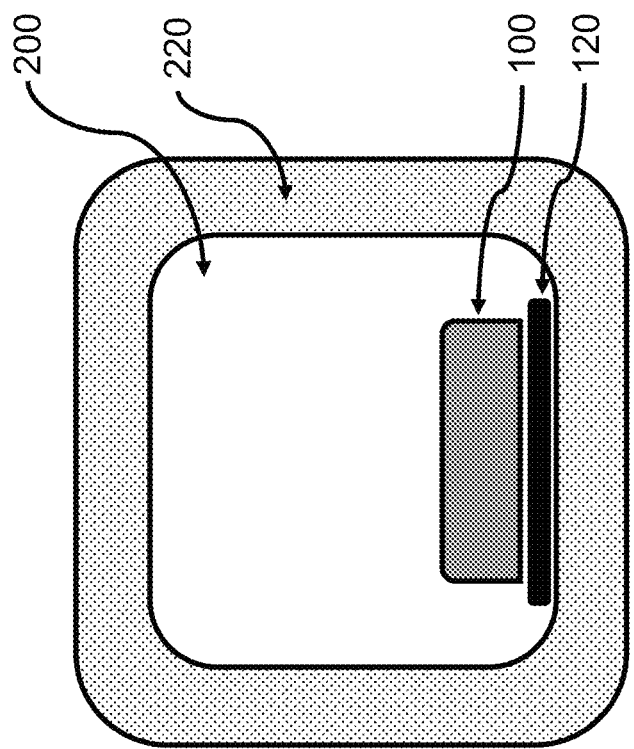
FIG. 4A is a diagram of a solid state refrigeration apparatus including a cooling chamber.

The HEAs of the invention may be incorporated into a magnetocaloric solid-state refrigeration apparatus. The apparatus includes one or more of the HEAs of the invention, and a source of magnetic field (e.g., a magnet, an electrical current passed through a solenoid). As shown in FIG. 4A, the HEA 100 and source of magnetic field 120 may be provided within a chamber 200 (which is not particularly limited as to its size or configuration as long as it is capable of encompassing the HEA). The HEA 100 and source of magnetic field 120 are depicted as being within the chamber 200, but may also be provided on an outside surface of the chamber, or as components within the structure forming the chamber. The chamber 200 may include insulation 220, and may be configured to separate into two or more parts, or may have an opening, door, or other means for accessing the interior of the chamber (not shown), in order to permit one or more objects to be placed within the chamber to be cooled. As shown in FIG. 4B, the HEA 100 may alternatively be configured in a shape that allows it to be placed adjacent to or in direct contact with an article 300 to be cooled without a surrounding chamber (e.g., having a flat surface compatible with a surface of a computer microprocessor chip or battery to be cooled).

The HEAs of the invention may also be used in methods such as additive manufacturing.

EXAMPLES

The invention will now be particularly described by way of example. However, it will be apparent to one skilled in the art that the specific details are not required in order to practice the invention. The following descriptions of specific embodiments of the present invention are presented for purposes of illustration and description. They are not intended to be exhaustive of or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

Example 1. Ingot Preparation

Ingots weighing approximately 60 grams with nominal compositions of $FeCoNi_{1+x}Cr_{1-x}Al$ and $FeCoNiCr_{1-x}Al_{1+x}$ (X=0.0, 0.1, 0.2, 0.3, 0.4 and 0.5) were prepared by arc melting under a high purity argon atmosphere. The purity of elements was higher than 99.99 atomic percent (at. %), and the ingots were remelted five times. The ingots were then cut into discs for magnetic measurements at low and room temperatures. Each sample was subsequently annealed at 600, 800, and 1000° C. for 3 hours, then furnace cooled, and tested after each anneal. Slices with thicknesses of ~0.60 mm were cut from each button. From these slices, discs with diameters of ~8.10 and ~6.25 mm were extracted for microstructural analysis and magnetic measurements, respectively.

Example 2. Magnetic Field Measurements

Magnetic field dependence of magnetization (M-H) was measured at room temperature using a Lakeshore vibrating sample magnetometer (VSM) under applied magnetic fields up to ±20 kOe; applied field values were not corrected for sample shape anisotropy (correction values are small, however, due to the aspect ratio of the disc samples). Temperature dependence of magnetization (M-T) was measured in both temperature ranges of 2-380 K and 100-440 K using a Quantum Design Magnetic Property Measurement System (MPMS XL) and the VSM with a liquid nitrogen ($LN_2$) cryogenic system, respectively. Energy dispersive x-ray spectroscopy (EDS, EDAX Genesis) was used for collecting compositional data including mapping for each element. X-ray diffraction was performed using a Bruker D8 Advance X-ray Diffractometer (XRD) with LynxEye detector, to determine the crystallographic phases present.

Example 3. Phase Change Analysis

The phase transformation between BCC and FCC due to spinodal decomposition results in a significant change in magnetic properties, such as saturation magnetization (S. M. Na et al., *AIP Advances* 9, 035010 (2019)).

Figure 5A:
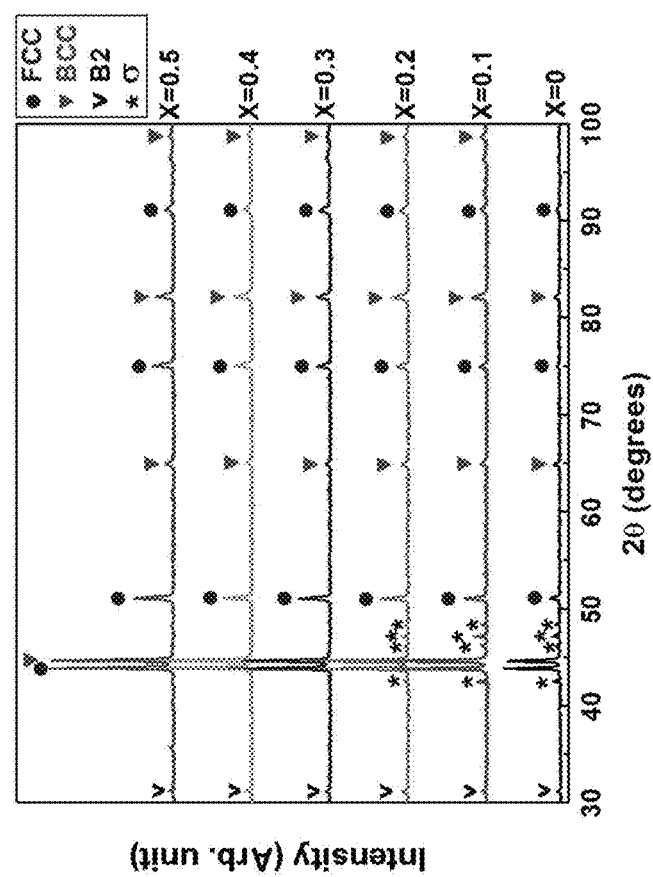
FIGS. 5A and 5B are graphs depicting X-ray diffraction (XRD) patterns of FeCoNi$_{1+x}$Cr$_{1-x}$Al HEAs (X=0.0-0.5).
Figure 5B:
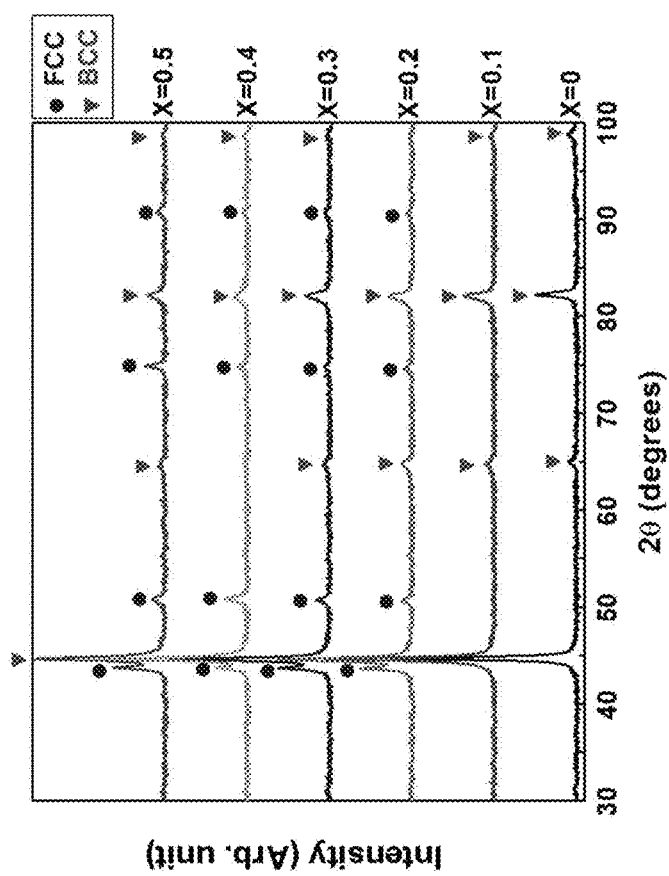

Crystallographic phase changes were systematically examined by varying the contents of Ni, Cr and Al elements. FIGS. 5A and 5B show x-ray diffraction (XRD) patterns for the FeCoNi$_{1+x}$Cr$_{1-x}$Al HEAs, where Fe, Co, and Al remain constant at 20 at %. The Ni content increases from 20 at % (X=0) to 30 at % (X=0.5), while the Cr decreases to 10 at % (X=0.5). By comparing peak intensities, the as-cast FeCoNi$_{1+x}$Cr$_{1-x}$Al HEAs exhibit a dominant BCC phase with a relatively low portion of FCC phase; only the BCC phase was observed at the equiatomic (X=0) and near equiatomic (X=0.1) FeCoNiCrAl HEAs.

Figure 12:
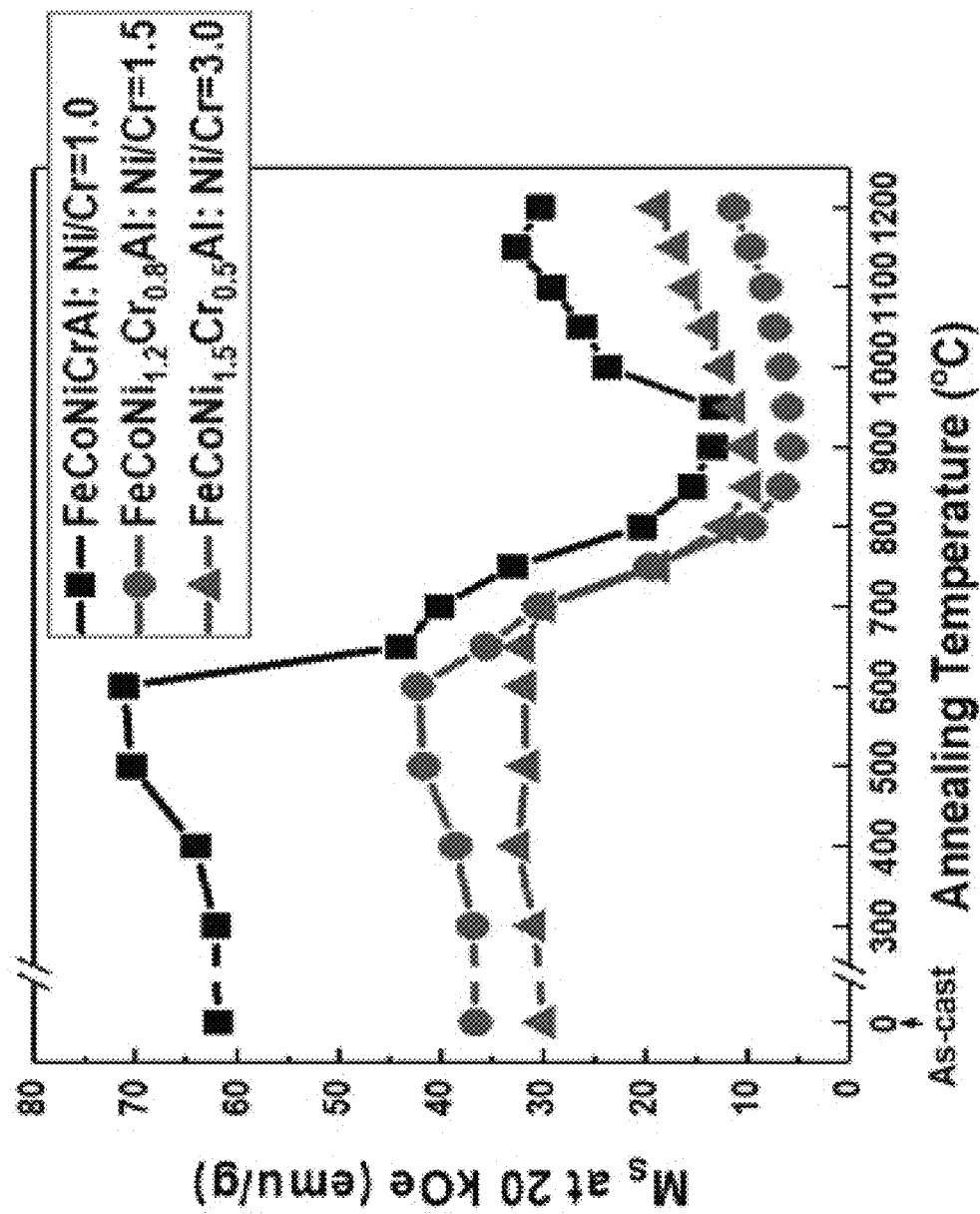
FIG. 12 is a graph depicting saturation magnetization at room temperature as a function of annealing temperature in FeCoNi$_{1+x}$Cr$_{1-x}$Al HEAs.

The effects of annealing temperature on structural and magnetic properties in FeCoNiCrAl-based HEAs with a varying Ni/Cr ratio were investigated. Ingots with nominal compositions of FeCoNi$_{1+x}$Cr$_{1-x}$Al (X=0-0.5) were prepared by arc melting and cut into discs for measurement. These discs were annealed at various temperatures from 300-1,200° C. for 3 hours, then furnace cooled. The measured saturation magnetization (MS) at room temperature strongly depends on both the Ni/Cr ratio and annealing temperature, as shown in FIG. 12. These changing properties are associated with the change of FCC phase fraction, as determined by x-ray diffraction.

Figure 14B:
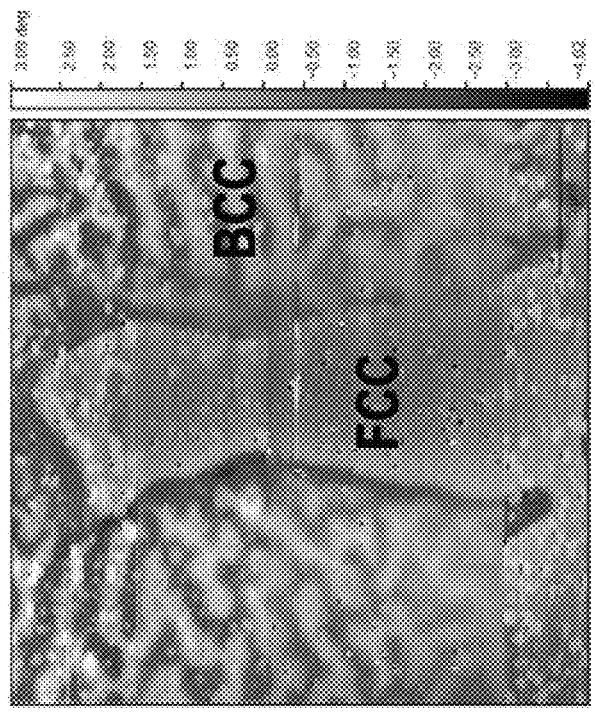
FIG. 14B is an MFM image taken from the same area of the as-cast FeCoNi$_{1.5}$Cr$_{0.5}$Al HEA.
Figure 14A:
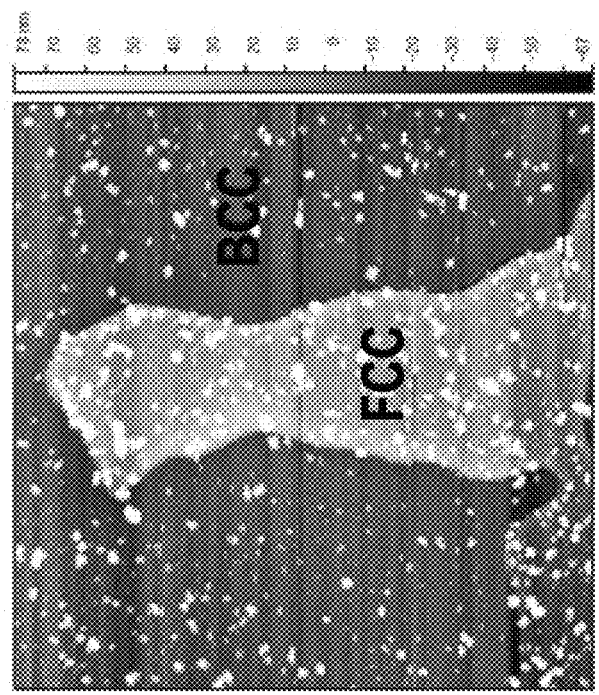
FIG. 14A is an AFM image taken of an as-cast FeCoNi$_{1.5}$Cr$_{0.5}$Al HEA.

After annealing the as-cast HEAs at 800° C., the relative integrated intensities of the FCC phase were enhanced and the phase was also found in the compositions of X=0 and 0.1 (as seen in S. M. Na, et al., AIP Advances 8, 056412 (2017) for 1,000° C.). Such a partial change from BCC to FCC has previously been observed in an equiatomic FeCoNiCrAl HEA over a broad range of annealing temperatures (~600-950° C.), and was attributed to spinodal decomposition, as is also observed in FIGS. 6A-6F. (W. R. Wang, et al., *J. Alloys Compd.* 589, 143 (2014); A. Munitz, et al., *J. Alloys Compd.* 683, 221 (2016); and W. H. Liu, et al., J. Metals 66, 1973 (2014).) After heat treatment at 850° C., the BCC phase transformed into the σ-FeCr phase, which was also present in the nearly equiatomic compositions of FeCoNiCrAl HEAs. The FeCr-enriched σ phase has been predicted and observed in nearly equiatomic FeCoNiCrAl HEAs annealed at 700-1,000° C., but dissolves into other phases at temperatures higher than 1,000° C. (W. R. Wang, et al., *J. Alloys Compd.* 589,143 (2014); T. M. Butler and M. L. Weaver, *J. Alloys Compd.* 691, 119 (2017).) An additional phase was also present at all composition ranges after annealing. This phase is probably ordered (i.e., having a B2 structure) due to the presence of what is likely a {100}reflection, as seen in FIGS. 5A and 5B. FIGS. 6A-6F shows a disconnected dendrite microstructure composed of BCC and FCC phases and the elemental distribution as determined by EDS mapping. It was confirmed by MFM that the BCC phase is ferromagnetic, while the FCC phase is paramagnetic (see FIGS. 14A-14B), as a ferromagnetic domain structure is clearly observed in the BCC structure.

Figure 13:
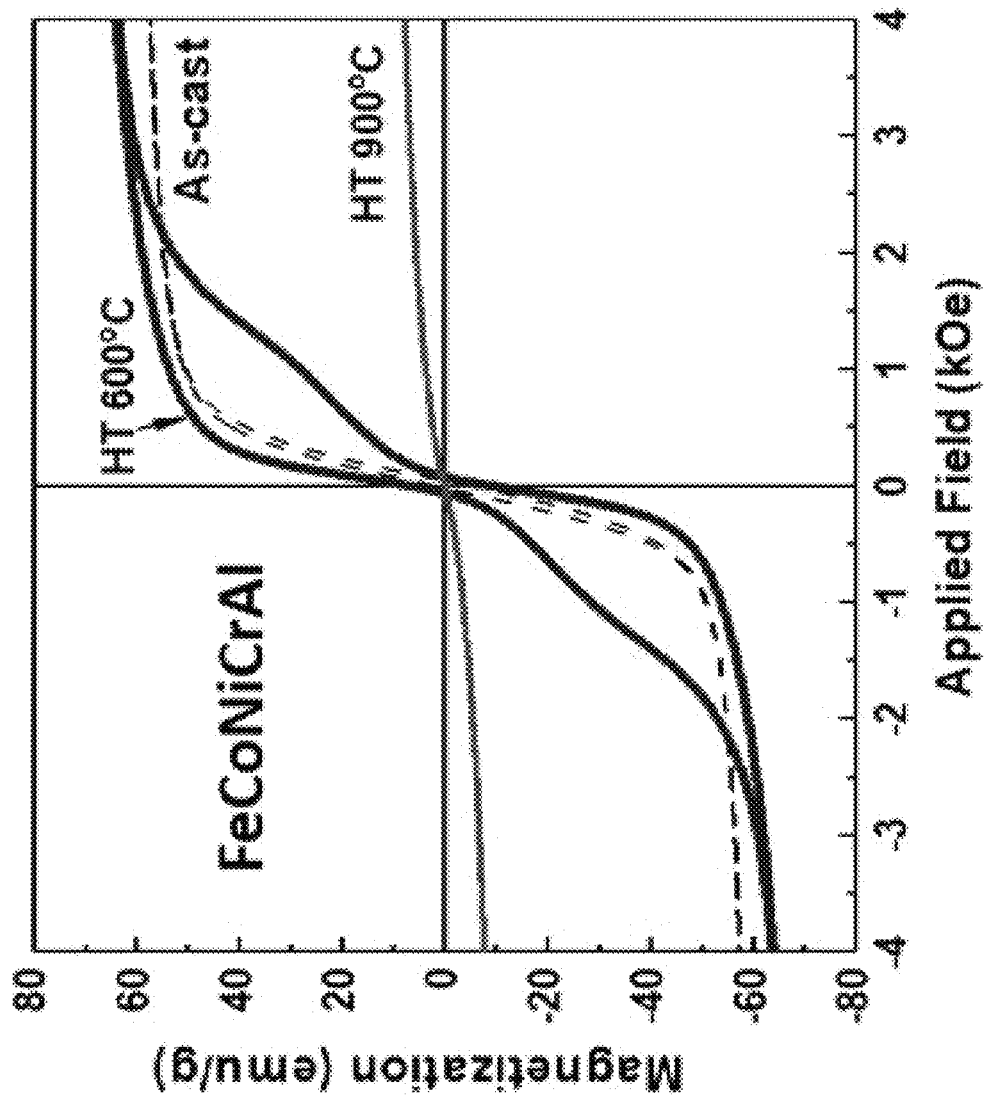
FIG. 13 is a graph depicting room temperature magnetization hysteresis loops for an FeCoNiCrAl alloy in the as-cast condition, and after two different high temperature anneals (600 and 900° C.).

FIG. 13 shows hysteresis loops with different sample conditions in the equiatomic FeCoNiCrAl HEA. A wasp-waist hysteresis loop was found only after annealing at 600° C., possibly due to negative (antiferromagnetic) exchange coupling between soft and hard magnetic phases in the BCC structure (L. H. Bennett and E. D. Torre, JAP 97, 10E502 (2005)).

TABLE 1

Summary of structural changes in HEAs of FeCoNiCr$_{1-X}$Al$_{1+x}$ and FeCoNi$_{1+x}$Cr$_{1-X}$Al.

| HEA Type | X amount in HEA | VEC | As-cast Structure | Agreement to VEC | Annealed at 800° C. Structure | Agreement to VEC |
|---|---|---|---|---|---|---|
| FeCoNiCr$_{1-X}$Al$_{1+x}$ (Switching Cr with Al) | X = 0.0 | 7.20 | BCC | No | BCC/FCC | Yes |
|  | X = 0.1 | 7.14 | BCC | No | BCC/FCC | Yes |
|  | X = 0.2 | 7.08 | BCC | No | BCC/FCC | Yes |
|  | X = 0.3 | 7.02 | BCC | No | BCC | No |
|  | X = 0.4 | 6.96 | BCC | No | BCC | No |
|  | X = 0.5 | 6.90 | BCC | No | BCC | No |
| FeCoNi$_{1+x}$Cr$_{1-X}$Al (Switching Cr with Ni) | X = 0.0 | 7.20 | BCC | No | BCC/FCC | Yes |
|  | X = 0.1 | 7.28 | BCC | No | BCC/FCC | Yes |
|  | X = 0.2 | 7.36 | BCC/FCC | Yes | BCC/FCC | Yes |
|  | X = 0.3 | 7.44 | BCC/FCC | Yes | BCC/FCC | Yes |
|  | X = 0.4 | 7.52 | BCC/FCC | Yes | BCC/FCC | Yes |
|  | X = 0.5 | 7.60 | BCC/FCC | Yes | BCC/FCC | Yes |

The typical dendritic structure was well-developed in the as-cast condition, but grew and became more disconnected during heat treatment, as seen previously. (A. Munitz, et al., *J. Alloys Compd.* 683, 221 (2016).) The elements of Ni and Al are enriched in the matrix BCC phase that correspond to the dark area in FIG. 6A, while Fe, Co and Cr are dominant in the FCC phase (the bright area). The composition maps of Fe and Cr elements are especially clear and well matched to each other, although composition variations are more pronounced in the Cr than in the Fe map. The crystal structures of as cast and annealed FeCoNiCr$_{1-x}$Al$_{1+x}$ HEAs were similarly analyzed using XRD; the general phase determination is summarized in Table 1.

The possible phases in HEAs can be phenomenologically predicted by VEC which is the number of total electrons accommodated in the valence band including s-, p- and d-electrons. (U. Mizutani, Hume-Rothery Rules for *Structurally Complex Alloy Phases* (CRC Press, Boca Raton, 2011).) The VEC is defined as $\Sigma_{i=1}{}^n c_i(VEC)_i$, where $(VEC)_i$ is the VEC for the individual element, and $c_i$ is the concentration of that element. It has been previously observed that only the FCC phase exists at VEC≥8.0, a mixture of FCC and BCC exists at 6.87≤VEC<8.0, and solely the BCC phase at VEC<6.87 in HEAs. (S. Guo, et al., *J. Appl. Phys.* 109, 103505 (2011).) Here, all FeCoNi$_{1+x}$Cr$_{1-x}$Al and FeCoNiCr$_{1-x}$Al$_{1+x}$ HEAs are assigned to the dual phase region according to the proposed rule for solid solution formation by the VEC, as shown in Table 1. The FeCoNi$_{1+x}$Cr$_{1-x}$Al HEAs were well-matched with the VEC phase determination, but FeCoNiCr$_{1-x}$Al$_{1+x}$ HEAs mostly show disagreement.

Example 4. Magnetic Property Analysis

In order to examine the effects of thermal processing on magnetic properties, hysteresis loops were measured as a function of composition and annealing temperature.

Figure 7:
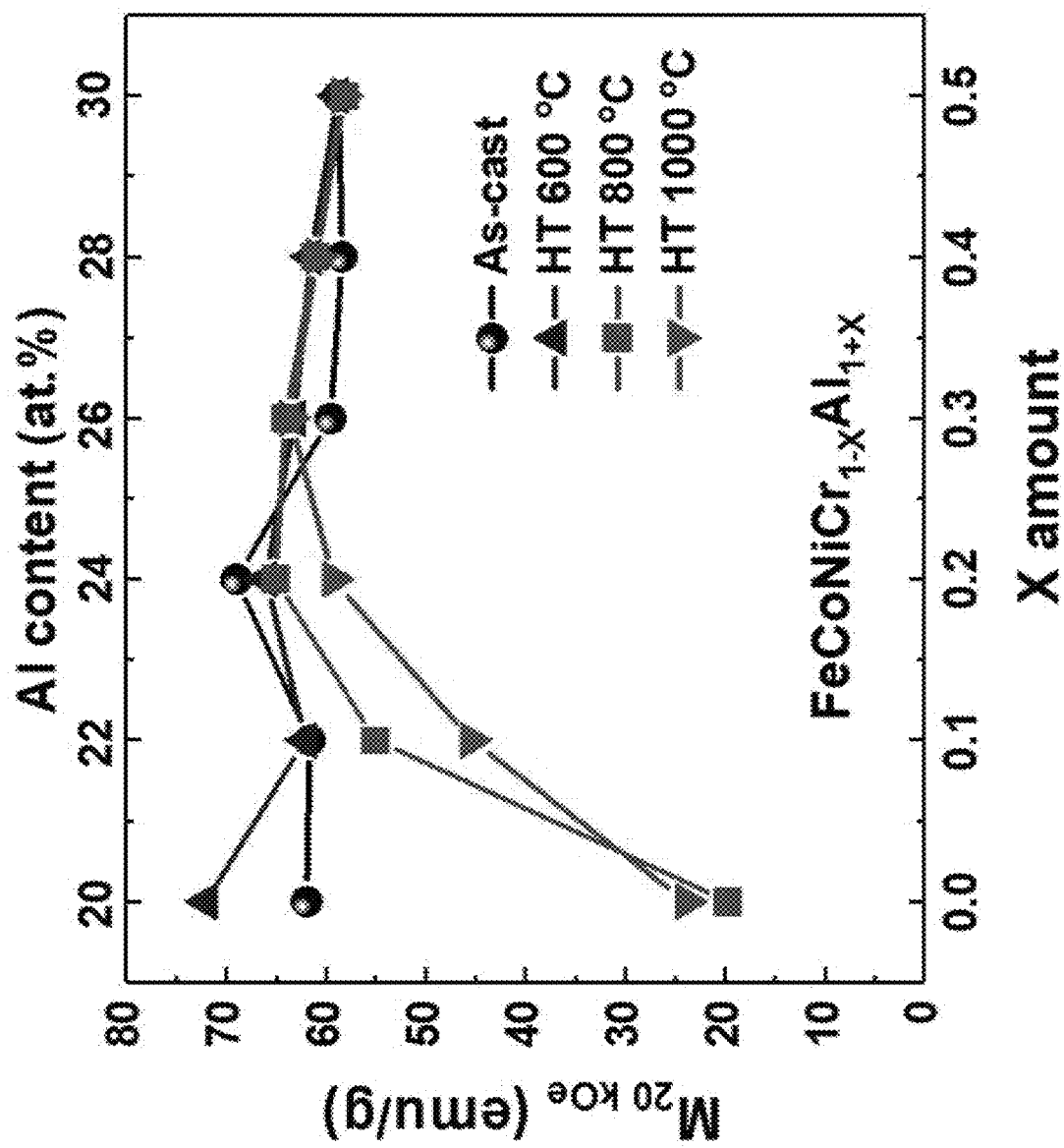
FIG. 7 is a graph depicting room temperature magnetization measured at 20 kOe ($M_{20\ kOe}$) as a function of subsequent annealing temperatures in FeCoNiCr$_{1-x}$Al$_{1+x}$ HEAs.

Magnetization values were measured at 20 kOe ($M_{20\ kOe}$) for comparison between samples, and are higher than 58 emu/g for all compositions in the as-cast FeCoNiCr$_{1-x}$Al$_{1+x}$ HEAs, due to the presence of a ferromagnetic BCC phase, as shown in FIG. 7. Samples above X=0.3 have $M_{20\ kOe}$ which are independent of the current annealing temperatures (up to 1,000° C.), indicating that the stability of the BCC phase might be enhanced as the Al content increases. In contrast, there are large differences in $M_{20\ kOe}$ when varying annealing temperatures for the FeCoNiCrAl base alloy, due to the partial transformation from BCC to FCC. This results in a reduction of $M_{20\ kOe}$ from 62 emu/g (as-cast) to 20 emu/g (800° C. Anneal).

Figure 9A:
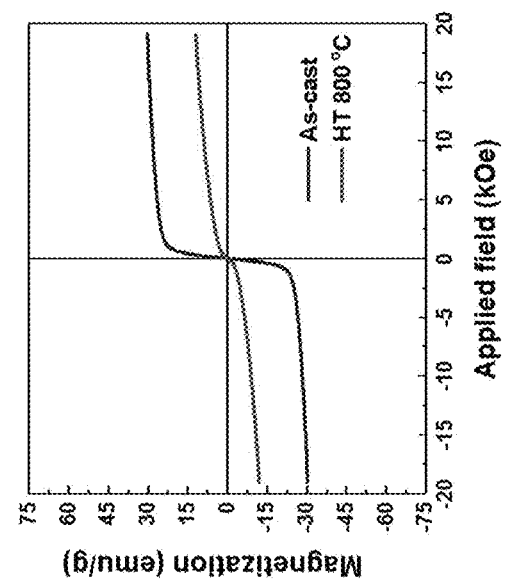
FIGS. 9A-9C show that the $M_{20\ kOe}$ values of FeCoNi$_{1+x}$Cr$_{1-x}$Al HEAs are sensitive to both composition and annealing condition, showing a range of 6.6 to 72.0 emu/g.
Figure 9B:
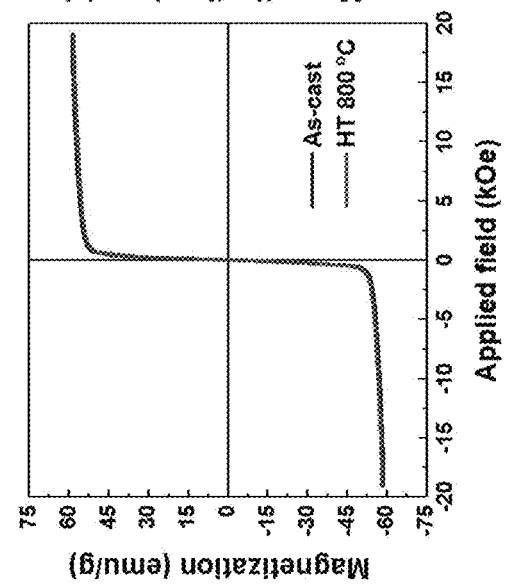

The hysteresis loops clearly show the different magnetic behaviors for FeCoNiCrAl (X=0) and FeCoNiCr$_{0.5}$Al$_{1.5}$ (X=0.5) HEAs in FIGS. 9A-9B, respectively. Assuming the FCC phase is fully paramagnetic, we can estimate the phase change from the $M_{20\ kOe}$ values between as-cast and annealed samples. A simple calculation for the Cr/Al switching case comparing the as-cast and annealed magnetization values indicates an FCC weight percentage of 14%, 27% and 68% for X=0.2, 0.1, 0, respectively, showing a similar trend with the peak intensity ratio of FCC and BCC phases in the XRD data.

Figure 8:
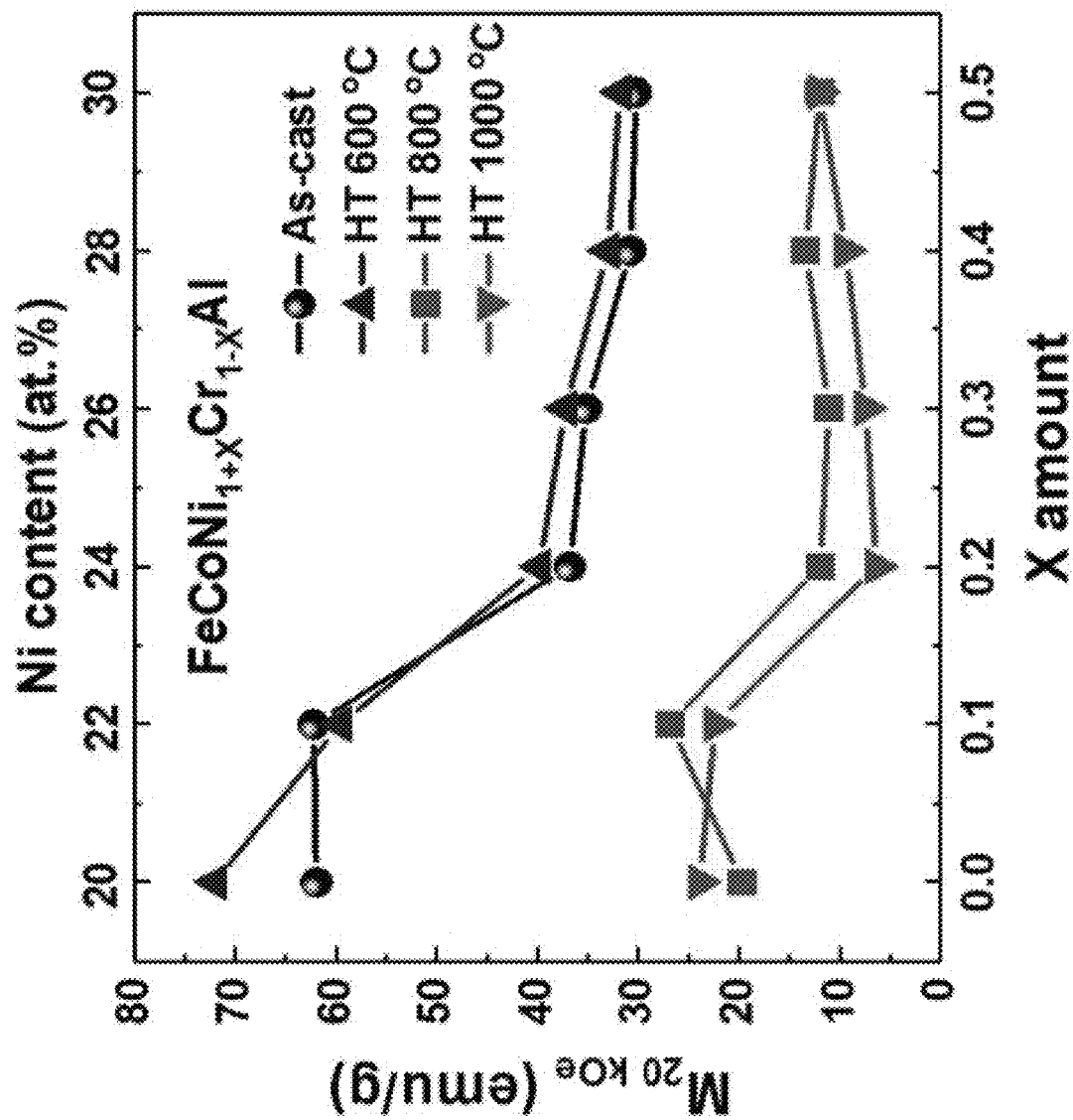
FIG. 8 is a graph depicting room temperature magnetization measured at 20 kOe ($M_{20\ kOe}$) as a function of subsequent annealing temperatures in FeCoNi$_{1+x}$Cr$_{1-x}$Al HEAs.
Figure 9C:
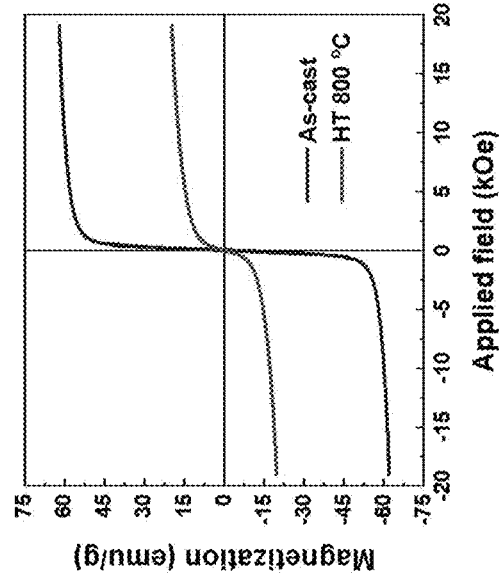

Unlike the magnetic behaviors of the FeCoNiCr$_{1-x}$Al$_{1+x}$ HEAs, FeCoNi$_{1+x}$Cr$_{1-x}$Al HEAs are very sensitive to elemental substitutions in the as-cast condition, resulting in the decrease of $M_{20\ kOe}$ with an increase of the Ni content, as shown in FIG. 8. As expected from the XRD data in Table 1, the value of $M_{20\ kOe}$ steeply drops from 62.2 emu/g (X=0.1, 22 at. % Ni) to 36.8 emu/g (X=0.2, 24 at. % Ni) because of the introduction of the FCC phase in the BCC matrix. Thereafter, it slowly decreases down to 30.2 emu/g at X=0.5 which corresponds to 30 at. % Ni and 10 at. % Cr. After a subsequent anneal at 800° C., all samples were not magnetically saturated even at an applied field of 20 kOe and the magnetization values at 20 kOe are much lower than those of the as-cast samples; an example can be seen in FIG. 9C (for FeCoNi$_{1.5}$Cr$_{0.5}$Al). This can be correlated to a transformation from the ferromagnetic BCC phase to the FCC phase, as was seen in the XRD results in FIG. 5B. From these results, the FeCoNi$_{1+x}$Cr$_{1-x}$Al HEAs may be good candidates for controlling the magnetization value by substitution and annealing processes.

Figure 10A:
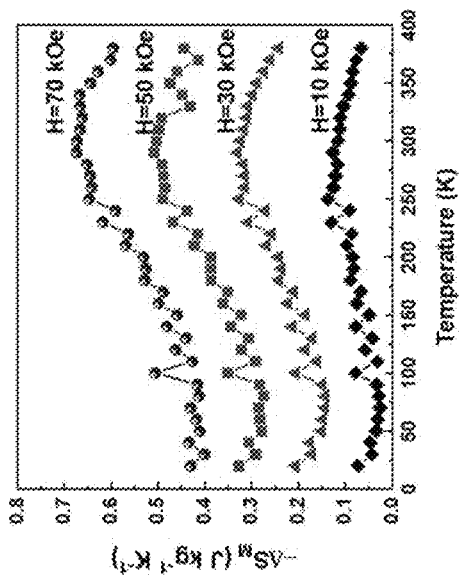
FIG. 10A is a graph depicting low temperature dependent magnetization of an FeCoNiCrAl HEA, initially annealed at 800° C.
Figure 10B:
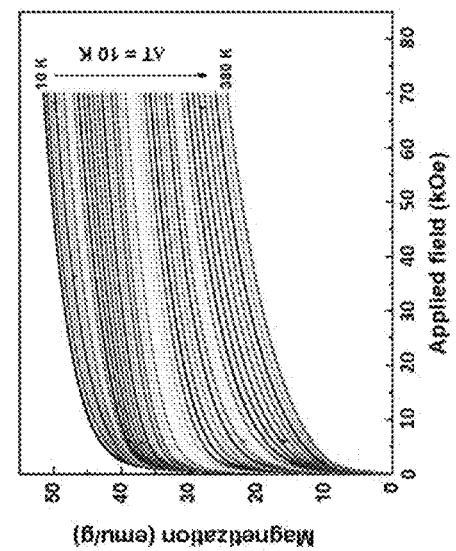
FIG. 10B is a graph depicting isothermal hysteresis loops for an FeCoNiCrAl HEA, initially annealed at 800° C., from 10 K to 380 K.
Figure 10C:
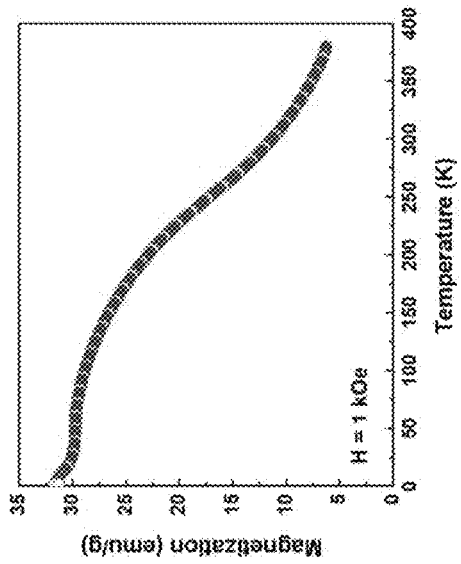
FIG. 10C is a graph depicting the temperature dependence of magnetic entropy change of an FeCoNiCrAl HEA. (Annealed at 800° C.) Measurements were taken using a magnetic properties measurement system (MPMS) and a vibrating sample magnetometer (VSM).
Figure 11A:
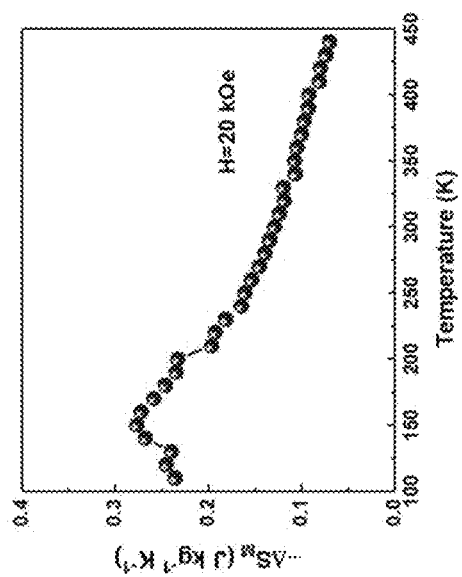
FIG. 11A is a graph depicting low temperature dependent magnetization of an FeCoNi$_{1.5}$Cr$_{0.5}$Al HEA, initially annealed at 800° C.
Figure 11B:
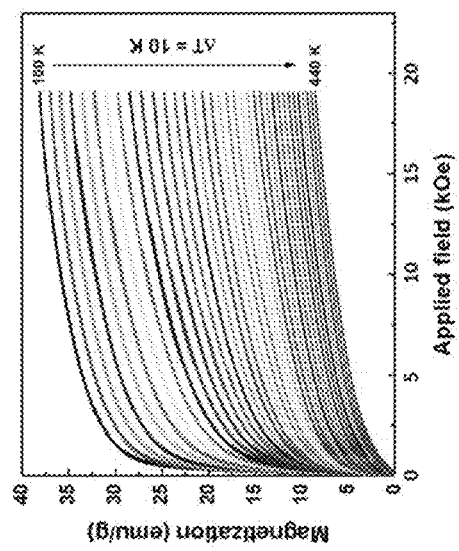
FIG. 11B is a graph depicting isothermal hysteresis loops for an FeCoNi$_{1.5}$Cr$_{0.5}$Al HEA, initially annealed at 800° C.
Figure 11C:
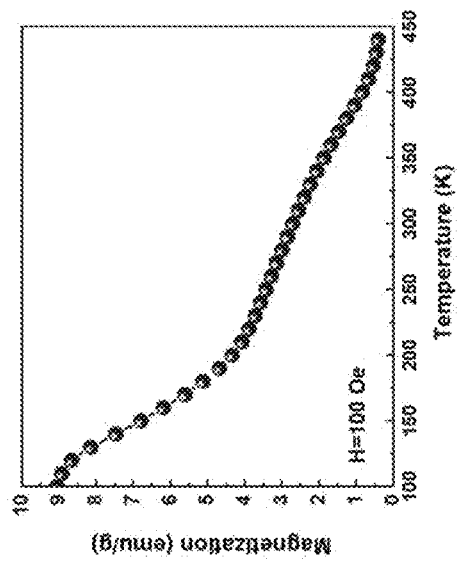
FIG. 11C is a graph depicting the temperature dependence of magnetic entropy change of an FeCoNi$_{1.5}$Cr$_{0.5}$Al HEA (annealed at 800° C.). Measurements were taken using an MPMS and a VSM.

The temperature-dependent magnetic behavior of FeCoNiCrAl and FeCoNi$_{1.5}$Cr$_{0.5}$Al HEAs annealed at 800° C. were measured; these samples showed a low magnetization at room temperature, but could still be potentially useful for magnetocaloric applications due to their broad phase change region. FIGS. 10A-10C and 11A-11C show the temperature dependence of magnetization, isothermal hysteresis loops and the temperature dependence of the magnetic entropy for both HEAs. A very broad magnetic phase transition from 100 K to 350 K was observed in the FeCoNiCrAl alloy. In the case of FeCoNi$_{1.5}$Cr$_{0.5}$Al, there was a first phase transition around 150 K attributed to the FCC phase, then the magnetization slowly decreased toward zero magnetization around 450 K. The hysteresis loops were obtained in the temperature ranges of 10-380 K and 100-440 K, respectively, as shown in FIGS. 10B and 11B. From these isothermal magnetization curves, the magnetic entropy changes ($\Delta S_M$) were calculated using Maxwell's relation:

$$\Delta S_M = \int_0^H \left(\frac{\partial M(H,T)}{\partial T}\right)_H dH \quad (1)$$

The values of ($\Delta S_M$) are found to be negative, with a peak entropy change of $-\Delta S_M=0.674$ J·kg$^{-1}$·K$^{-1}$ at 290 K and an applied field of ~70 kOe for the FeCoNiCrAl, and a peak entropy change of $-\Delta S_M=0.277$ J·kg$^{-1}$·K$^{-1}$ at 150 K and 20 kOe for the FeCoNi$_{1.5}$Cr$_{0.5}$Al sample; this temperature is much lower than that for the FeCoNiCrAl alloy (290 K). While small in value, the broad magnetic entropy change centered near RT, as seen in the FeCoNiCrAl alloy, may lead to a large refrigerant capacity (RC), which is a measure of the energy that can be transferred between high and low temperatures. RC was estimated by taking the full width at half maximum of the peak in $-\Delta S_M$, corresponding to $RC_{FWHM}=|\Delta S_M^{Peak}|\times\delta T_{FWHM}$. The RC values of 119.2 and 242.6 J·kg$^{-1}$ at 30 and 70 kOe in the annealed FeCoNiCrAl, respectively, are higher than that of Fe—Tm—B—Nb metallic glasses with $T_c$=325 K ($RC_{FWHM}$=57 J·kg$^{-1}$ at 15 kOe) although the observed value in $-\Delta S_M$ is somewhat lower than that of other metallic glasses in the series, 0.87 J·kg$^{-1}$·K$^{-1}$ at 325 K. (J. Li, et al., *J. Non-Crystalline Solids* 425, 114 (2015).) High-entropy metallic glasses (HEMG) such as HoErCoAlX (X=Gd, Dy, and Tm) show a high $|\Delta S_M^{Peak}|$ of 11.2-15.0 J·kg$^{-1}$·K$^{-1}$ and $RC_{FWHM}$ of 375-627 J·kg$^{-1}$ at 50 kOe, but $T_c$ is too low to be used at ambient temperature, ranging from 9-37 K. (J. Huo, et al., *J. Appl. Phys.* 117, 073902 (2015).)

The FeCoNi$_{1+x}$Cr$_{1-x}$Al HEAs matched with the VEC model, exhibiting the coexistence of FCC and BCC phases for both the as-cast and annealed conditions. Magnetic properties were significantly affected by increases in the phase percentage of the FCC phase, which is strongly related to both elemental substitution and the annealing condition. The $M_{20\ kOe}$ of FeCoNi$_{1+x}$Cr$_{1-x}$Al HEAs are sensitive to both composition and annealing condition, showing a range of 6.6-72.0 emu/g. The annealed FeCoNiCrAl HEA shows a maximum value of magnetic entropy change around room temperature and increased refrigerant capacity values due to a broad magnetic entropy change.

Example 5. Magnetoelastic Properties Analysis

Figure 15:
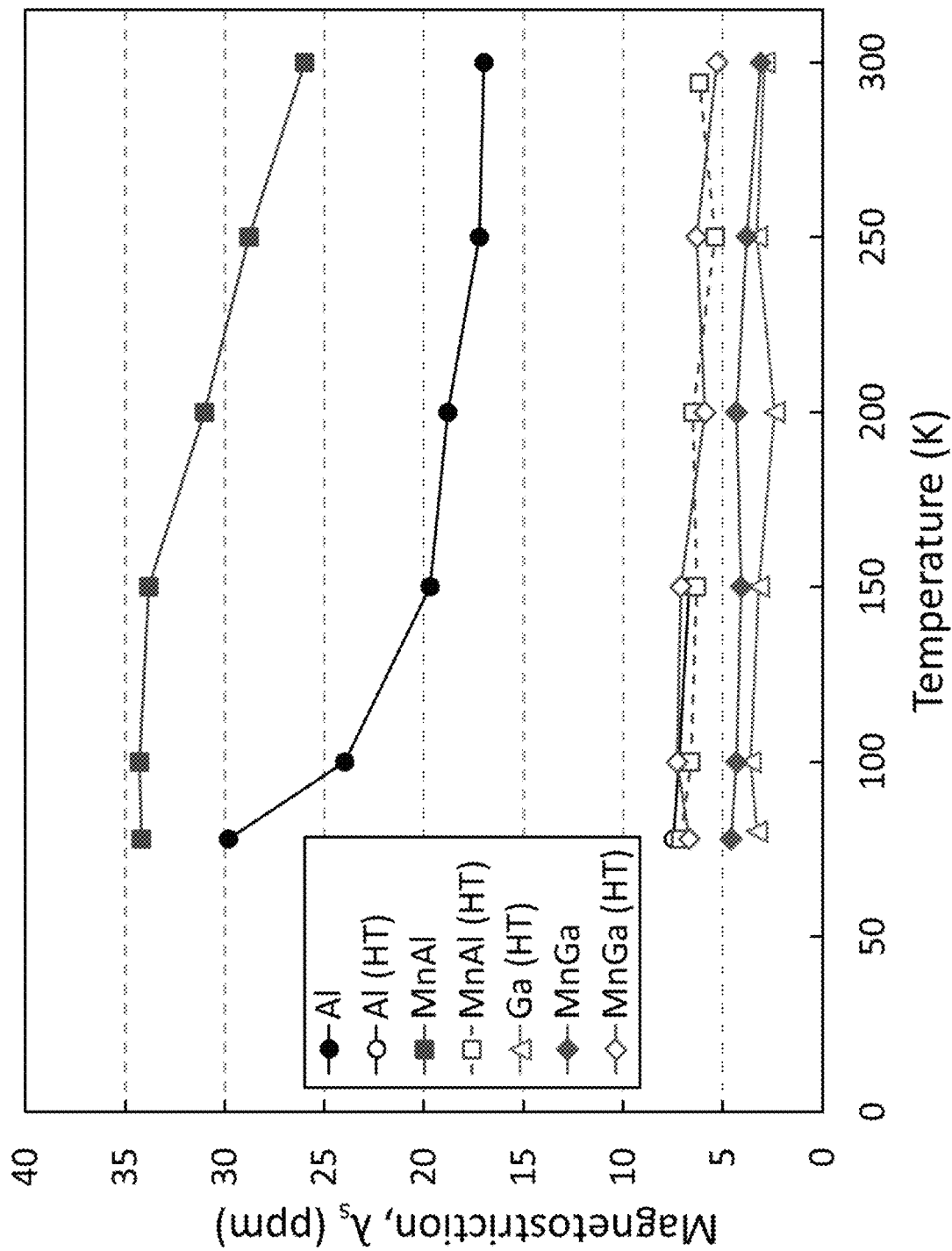
FIG. 15 depicts the polycrystalline magnetostriction values ($\lambda_s$) as a function of temperature, from 78 to 300 K, for various HEA compositions and under different annealing conditions. The base alloy is FeCoNiCr, with the addition of Al, Ga, MnAl, or MnGa. Unmarked alloys were measured in the as-cast condition, and "HT" alloys were annealed as follows: Al—800° C., 3 hours, furnace cooled; Ga—1,000° C., 48 hours, furnace cooled; MnAl—1,000° C., 48 hours, furnace cooled, MnGa—800° C., 3 hours, furnace cooled.

Various HEAs were fabricated using an arc melting apparatus (as described above) with a base alloy composition of FeCoNiCr, and additions of Al, Ga, MnAl, or MnGa. The polycrystalline magnetostriction, $\lambda_s$, was measured in as-cast (unmarked) and annealed (HT) conditions as a function of temperature, from 78 to 300 K (see FIG. 15). The base alloy is FeCoNiCr, with the addition of Al, Ga, MnAl, or MnGa (only the addition is shown in the legend of FIG. 15). Unmarked alloys were measured in the as-cast condition, and "HT" alloys were annealed as follows: Al—800° C., 3 hours, furnace cooled; Ga—1,000° C., 48 hours, furnace cooled; MnAl—1,000° C., 48 hours, furnace cooled, MnGa—800° C., 3 hours, furnace cooled.

The annealed conditions were as follows, identifying only the additional elements to the base alloy: Al—800° C., 3 hours, furnace cooled; Ga—1,000° C., 48 hours, furnace cooled; MnAl—1,000° C., 48 hours, furnace cooled, MnGa—800° C., 3 hours, furnace cooled.

While most of the alloys measured showed polycrystalline magnetostriction values ($\lambda_s$) below 10 ppm, the as-cast FeCoNiCrAl and FeCoNiCrMnAl samples showed values reaching 30 and 34 ppm, respectively, at cryogenic temperatures (exhibiting 17 and 26 ppm at room temperature). These values drop down after a high temperature anneal.

Figure 16:
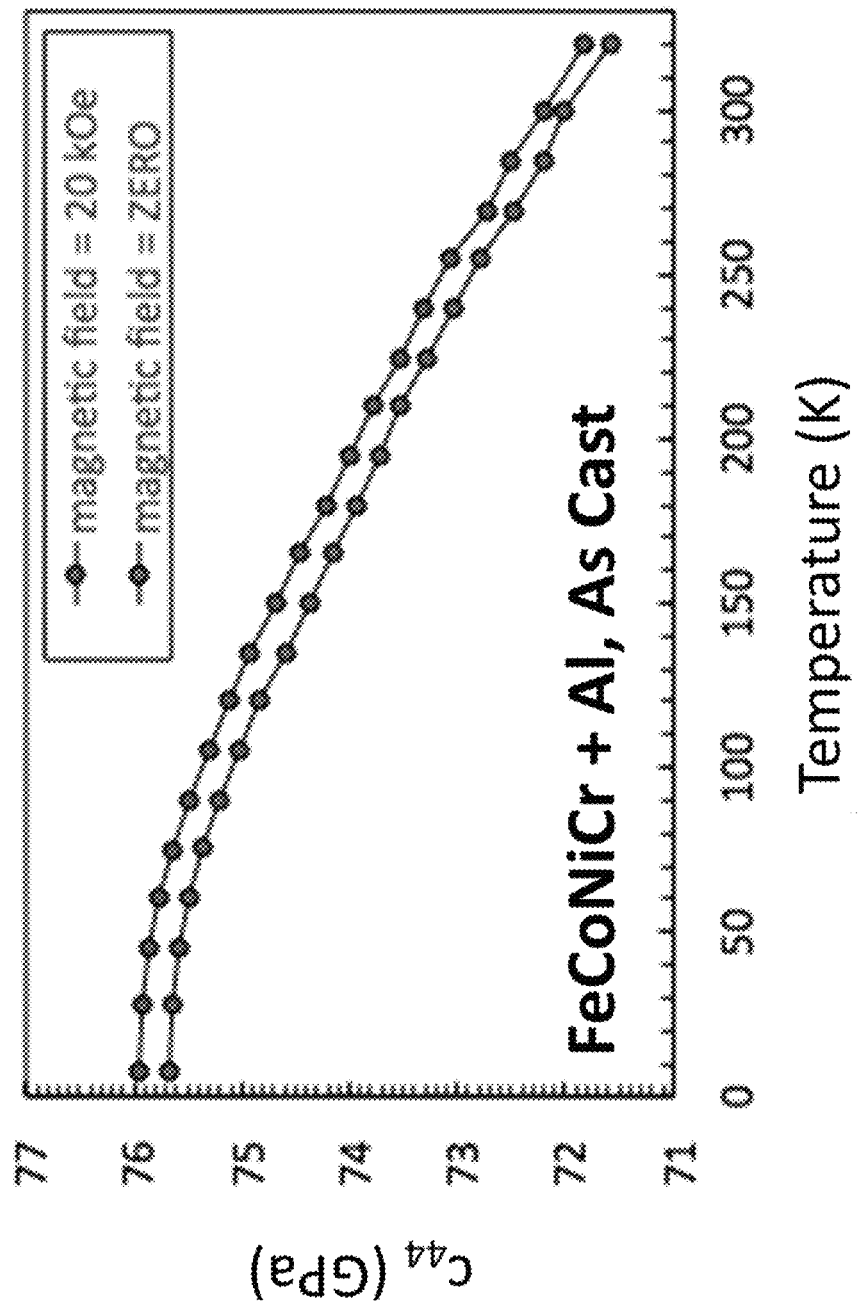
FIG. 16 depicts the shear modulus, $c_{44}$, of an as-cast FeCoNiCrAl HEA measured using resonant ultrasound spectroscopy (RUS) as a function of temperature, both with and without a magnetic field applied.

The elastic parameters of an as-cast FeCoNiCrAl HEA were measured using resonant ultrasound spectroscopy (RUS) as a function of temperature, both with and without a magnetic field applied. FIG. 16 depicts the shear modulus, $c_{44}$, of an as-cast FeCoNiCrAl HEA measured using resonant ultrasound spectroscopy (RUS) as a function of temperature, both with and without a magnetic field applied. A typical elastic behavior was observed for both longitudinal ($c_{11}$) and shear ($c_{44}$) elastic constants, exhibiting less than 6% stiffening from 320 K to 7K. At room temperature, the longitudinal modulus ($c_{11}$=256 GPa) was close to that of Fe, but the shear modulus ($c_{44=72}$ GPa) was almost half of that of Fe. A small Delta-E effect, of 0.3% at all temperatures, was observed.

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed:

1. An alloy comprising: Fe from 15 at % to 20 at %, Co from 15 at % to 20 at %, Ni from 15 at % to 30 at %, Cr from 10 at % to 20 at %, Mn from 15 at % to 20 at %, and Ga from 15 at % to 30 at %,
   wherein a base alloy composition comprises FeCoNiCr,
   wherein an alloying addition is MnGa,
   wherein the alloying addition provides the alloy with a polycrystalline magnetostriction property of at least 3 ppm across a range of temperatures, the range of temperatures spanning a room temperature and a cryogenic temperature, and
   wherein the alloy is subject to an annealing process that changes h a-e polycrystalline magnetostriction property across the range of temperatures relative to an as-cast alloy polycrystalline magnetostriction property, and
   wherein the room temperature is 300 K and the cryogenic temperature is 78 K.

2. The alloy of claim 1, wherein the alloy is provided in a structural mount based on a magnetic hysteresis characteristic of the alloy.

3. The alloy of claim 1, wherein the alloy provides solid state cooling in the presence of a magnetic field.

4. The alloy of claim 1, wherein the annealing process is conducted at 1,000° C. for 48 hours and then furnace cooled.

5. The alloy of claim 1, wherein the annealing process is conducted at 800° C. for 3 hours and then furnace cooled.

6. A solid-state refrigeration apparatus, comprising:
   an alloy comprising: Fe from 15 at % to 20 at %, Co from 15 at % to 20 at %, Ni from 15 at % to 30 at %, Cr from 10 at % to 20 at %, Mn from 15 at % to 20 at %, and Ga from 15 at % to 30 at %,
   wherein a base alloy composition comprises FeCoNiCr,
   wherein an alloying addition is MnGa,
      wherein the alloying addition provides the alloy with a polycrystalline magnetostriction property of at least 3 ppm across a range of temperatures, the range of temperatures spanning a room temperature and a cryogenic temperature, and
      wherein the alloy is subject to an annealing process that changes h polycrystalline magnetostriction property across the range of temperatures relative to an as-cast alloy polycrystalline magnetostriction property, and
      wherein the room temperature is 300 K and the cryogenic temperature is 78 K; and
   a source of magnetic field.

7. The solid-state refrigeration apparatus of claim 6, where the alloy is provided within an insulated chamber.

8. An alloy comprising:
   Fe from 15 at % to 20 at %, Co from 15 at % to 20 at %, Ni from 15 at % to 30 at %, Cr from 10 at % to 20 at %, Mn from 15 at % to 20 at %, and Ga from 15 at % to 30 at %,
   wherein a base alloy composition comprises FeCoNiCr,
   wherein an alloying addition is MnGa,
   wherein the alloy is subject to an annealing process that changes a polycrystalline magnetostriction property of the alloy.

9. The alloy of claim 8, wherein the Ga amount is 16.67 at % the balance is an equiatomic composition of Fe, Co, Ni, Cr, and Mn.

* * * * *